Patented May 26, 1931

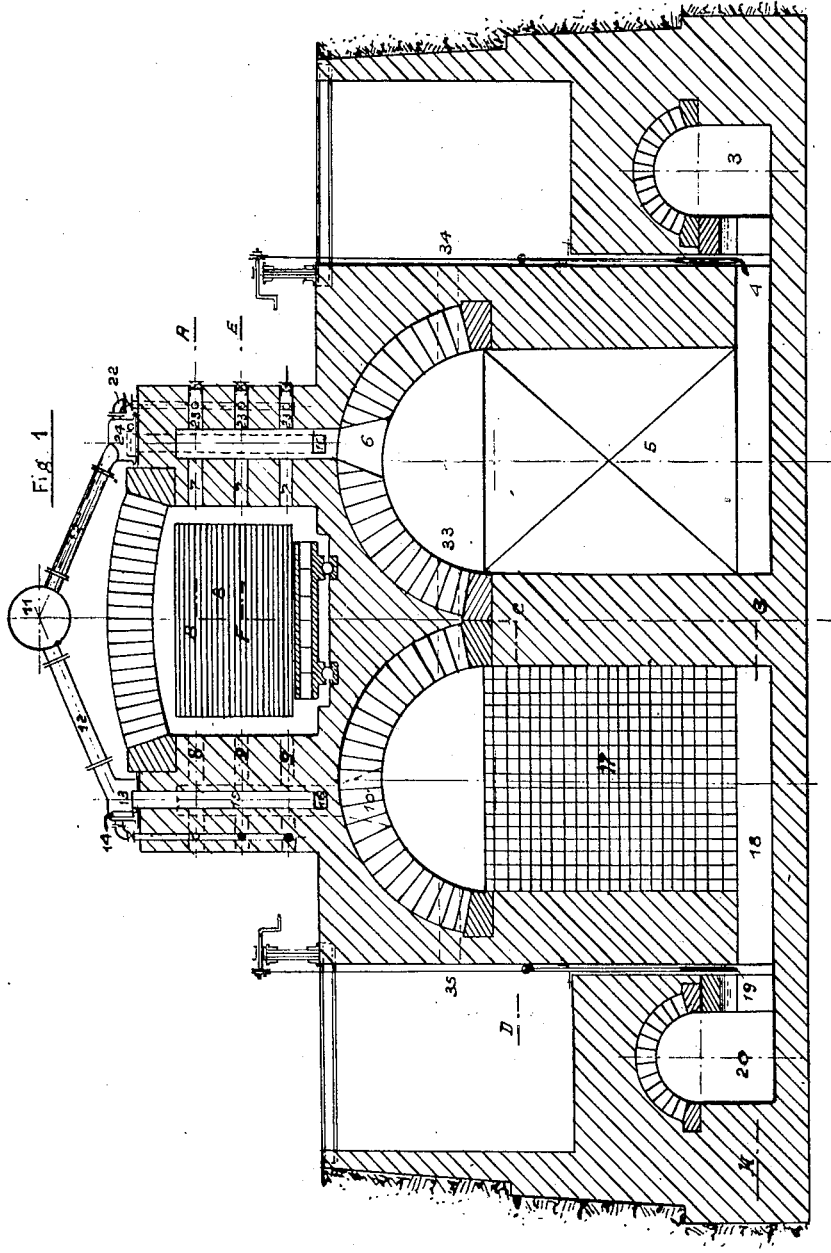

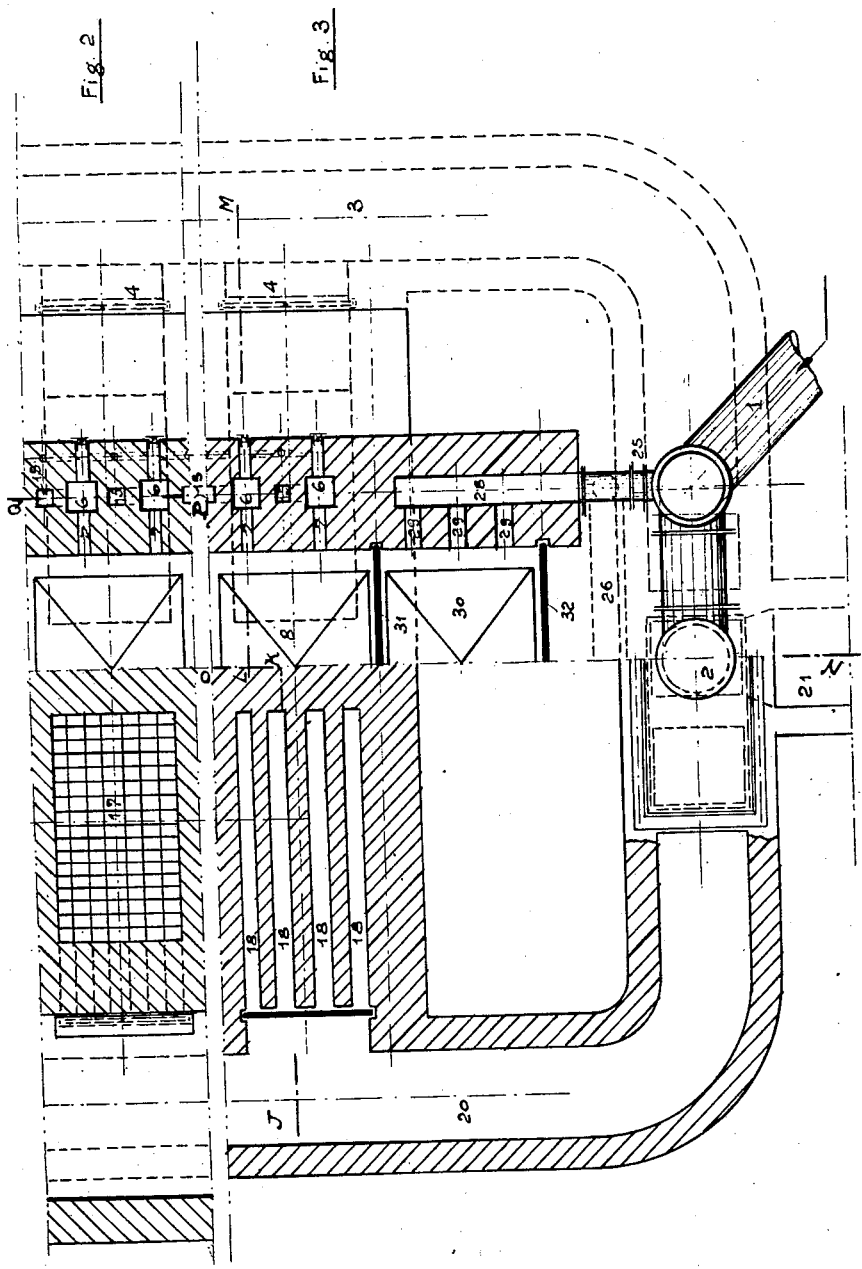

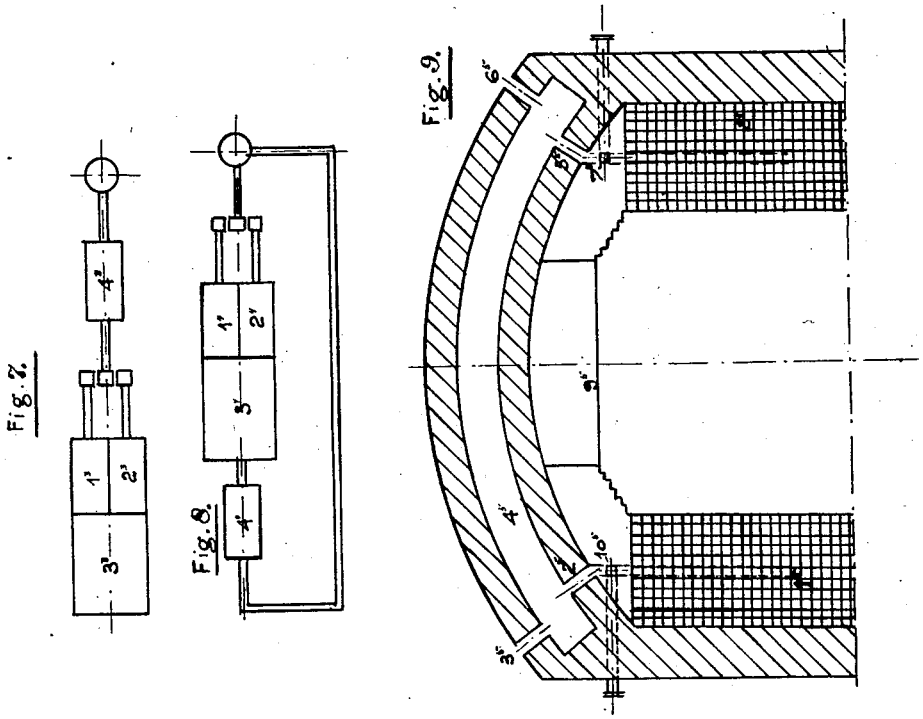
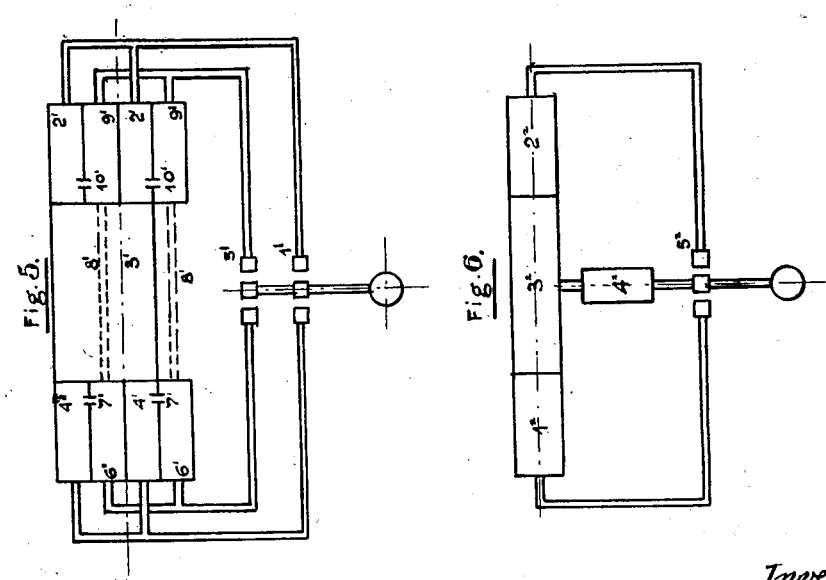

1,807,257

UNITED STATES PATENT OFFICE

HERBERT SCHAEFER, OF LUXEMBURG, LUXEMBURG

PROCESS FOR HEATING IN A GASEOUS ATMOSPHERE PARTICULARLY IN A REDUCING OR OXIDIZING ATMOSPHERE

Application filed November 30, 1927, Serial No. 236,795, and in Luxemburg October 4, 1927.

It is often required in industry to heat substances to relatively elevated temperatures in a reducing or oxidizing atmosphere or in the presence of a particular gas either for the purpose of simply heating the substances or for the purpose of obtaining chemical reaction.

In the metallurgical industry in particular pieces of metal are annealed for the purpose of softening them. In annealing furnaces in which the heating is affected by flames or by gaseous products of combustion the pieces to be heated are exposed to the oxidizing action of the flames even if the combustion is effected with insufficient air. The combustion products contain large proportions of water vapour and carbonic anhydride which may have an oxidizing action at high temperatures. Even if the combustion products also contain reducing gases the latter are diluted with such large proportions of neutral gases that their action is considerably diminished if not nullified.

The present invention provides a simple and economical heating process in which the substance is heated without a flame and without preliminary combustion by heated gases. These gases may be oxidizing or reducing or may have any other property according to the nature of the process.

The heating apparatus comprises essentially a working chamber in which the material to be heated is placed. The working chamber may be arranged for continuous or discontinuous heating.

The working chamber is connected to a system of regenerators grouped in pairs. According as the heating is to take place in a reducing or oxidizing atmosphere a combustible or burning gas is introduced at the base of the regenerator this regenerator having been heated in a preceding period as will appear hereinafter.

The gas is raised to a high temperature by contact with the regenerator and is passed through the working chamber of the furnace without having been mixed with the burning or combustible gases. It therefore heats the material placed in the working chamber by giving up to the material a part of its sensible heat. This gas leaves the working chamber and passes into the second member of a pair of regenerators of which the first member is that through which the gas passes into the furnace. During its passage from the working chamber to the regenerator this gas is mixed with burning or combustible gases and is ignited at the entrance to the regenerator so that it raises the latter to a high temperature, the products of combustion leaving the regenerator by a reversing flap and passing out to the chimney or to a continuous heat recuperating apparatus.

During the succeeding period of operation the incoming gas is reversed by means of the reversing flap and the incoming air is reversed by means of suitable elements such as clacks etc. The gas now passes in through the regenerator which was previously being heated to the working chamber and passes thence to the regenerator which was previously being cooled, and before passing into this regenerator the gas meets the burning or combustible gas and is ignited and heats the regenerator filling.

By manipulating the reversing device for the combustible and burning gas an atmosphere of reducing or oxidizing gas heated between limits of temperature which depend upon the frequency of reversal and the dimensions of the regenerators etc. is maintained in the working chamber.

By secondary admission of one of the gases a partial combustion can be effected before the gas passes into the working chamber of the furnace so that if desired an atmosphere may be provided which has the chemical properties required in the working chamber.

Moreover by arranging passages between two corresponding regenerators it is possible to heat one regenerator by a hot gas coming from the corresponding regenerator without allowing the gas to pass through the working chamber of the furnace. In this case a part only of the heated gas will pass through the working chamber of the furnace. The regenerator may also be heated during the heating period by gases supplied directly by a reversing flap, suitable reversing elements being interposed.

Further the two heating gases may be heated by regenerators, continuous recuperators or by a combination of these.

Fig. 1 is a vertical section of the furnace.
Figs. 2 and 3 are sectional plans.
Fig. 4 is a section on NOPQ of Figs. 2 and 3.
Figs. 5, 6, 7 and 8 are diagrammatical views of various modifications.
Fig. 9 is a vertical section of an arrangement in which the regenerators deliver directly upwards to the working chamber.
Figs. 10 and 11 are respectively a sectional plan and a vertical section of the furnace showing the circulation of the reducing gases.

Figures 1, 2, 3 and 4 show a form of the invention applied to a furnace for heating sheet iron plates in a reducing atmosphere. The reducing heating agent employed may be for example producer gas, the other gas in this case being atmospheric air heated or not.

Fig. 1 is a section on JKLM of Fig. 3 the right hand part of Fig. 1 being a section in LM through the gas passage 6 of Fig. 3. The left hand part of Fig. 3 shows a section through an air passage 15.

Figure 4:
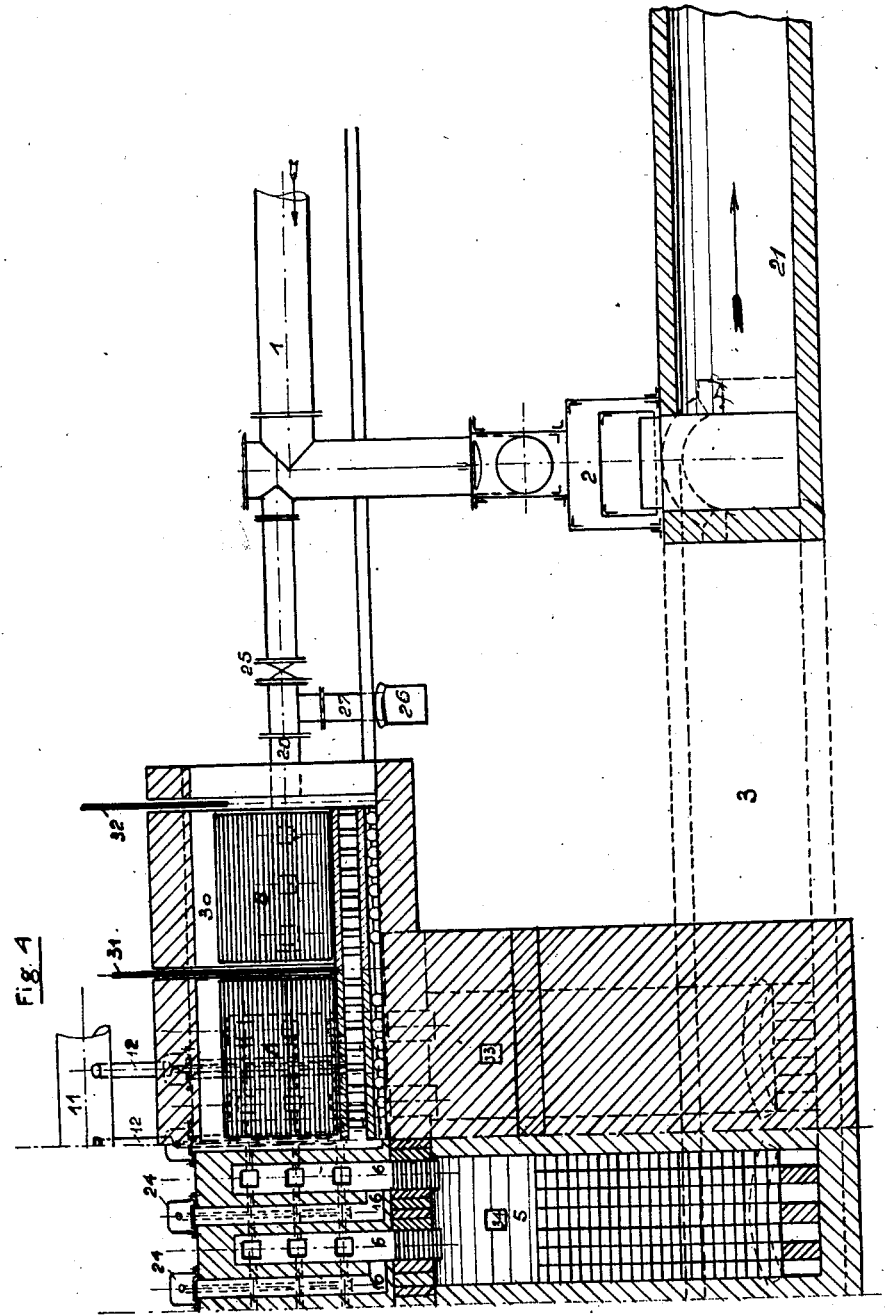
Figure 10:
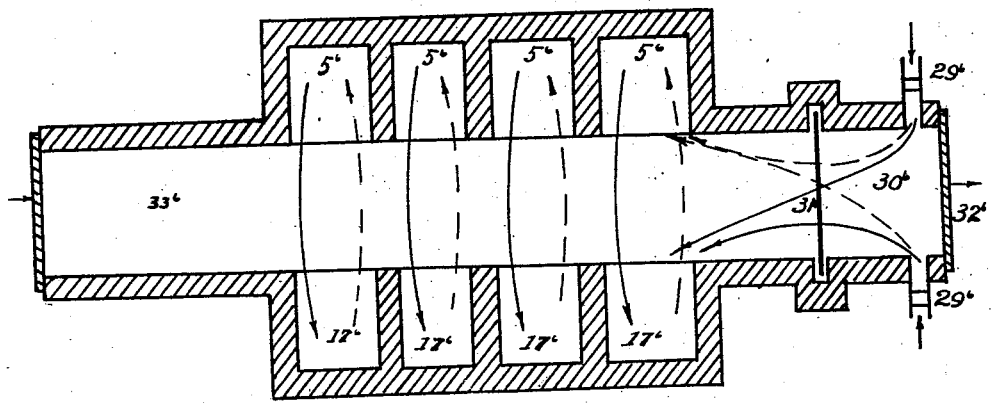

Fig. 4 is a section on NOPQ of Figs. 2 and 3. The gas is led to the reversing valve 2 by the conduit 1 (Figs. 2 and 3) and from this point it is distributed by the flue 3 to the various regenerators placed on one side of the furnace through passages provided with a regulator 4. The gas heated in the checkers 5 is distributed by the passages 6 and passes into the working chamber of the furnace by the inlets 7. It heats the plates 8 and passes out of the furnace by the passages 9 and 10.

The air, heated or not, passes in through the main 11 and airpipes 12 and flapvalves 13 and, the flaps 14 being open, it is distributed through passages 15 and mixes with the gas through the openings 16. At the inlet to the regenerator 17 the air and gas meet and are ignited. The combustion products heat the checkers 17 and return to the reversing valve through the regulating slides 19 and passages 20 whence they go through the flue 21 to the chimney or to a continuous heat recuperator. On reversing the valve 2, closing the flaps 14 and opening the flaps 24 the gas passes in through the flue 20 and is distributed to the regenerators 17 where it is heated and then it passes into the working chamber of the furnace by the outlets 10 and 9. The gas leaves the furnace by passages 7 and enters the regenerator 5 through passages 6. The air is admitted by flapvalves 24 and openings 16 and mixes with the gas which is ignited to heat the checkers 5.

The working chamber of the furnace may be arranged as shown in Figure 4 which represents for instance the discharge end of the furnace. The plates to be heated are placed on ball trucks and arranged in such a manner that there is a free space between each group. The trucks are put into the furnace in such a way as to occupy the position shown in the drawings at the time of discharge.

The slide 31 is closed and the slide 32 is opened so as to isolate the compartment 30 from the rest of the furnace. The truck in the compartment 30 can then be moved out of the furnace. This operation having been effected the slide 32 is closed and the slide 31 opened thus permitting a fresh truck to be moved into the compartment 30.

Naturally the working chamber of the furnace can be subdivided into several compartments similar to the compartment 30. The charging can also be effected in the same way.

In order to cool the plates in this compartment, cold gas coming from the conduit 1 under the control of the valve 25 is passed into the compartment by the pipe 28. The other side of the compartment receives gas from the pipe 27 and the underground channel 26. The gas is heated by contact with the hot plates and may or may not be led into the working chamber of the furnace, to contribute to the heating of the checkers.

By providing a connection 33 between the corresponding chambers as shown in dotted lines in Figure 1 these chambers can be heated by a hot gas which has not passed through the working chamber of the furnace.

By providing a communication between the channel 20 and the chambers 5 and between the channel 3 and the chambers 17 and interposing suitable valve devices each chamber can be supplied during the heating period with a portion of nonpreheated gas. The communication between the two chambers may naturally be arranged in such a way as to permit of regulation of the quantity of gas admitted.

Combustion can be started before the entry of the gas into the working chamber by providing air intakes 22 opening into the channels 23 these intakes being regulated by a valve. In this case the gas which passes in for example through the channel 6 receives a small quantity of air by the channels 23.

This same arrangement enables the working chamber to be heated in an oxidizing atmosphere for example hot air. For this purpose it is sufficient to lead in the gas through the main 11 and the air through the main 1. In this case the air heated in the regenerators passes through the working chamber and comes into contact with the gas at the outlet of the furnace working chamber.

This heating system can be applied to all kinds of furnaces known in the metallurgical, ceramic, glass-making and chemical industries.

In metallurgical industry and particularly sheet-rolling mills this furnace system enables sheets to be annealed without boxes. It permits of heating to a white annealing "without the formation of oxide." It also enables the annealing of coils of wire etc. without boxes.

In the chemical industry it is often necessary to effect a reaction at high temperatures in an oxidizing or reducing atmosphere and this heating system finds many applications in this industry. It may be applied to gases other than combustible or burning gases in the strict sense of the word. Any two gases capable of combining together and giving heat may be used in the application of this heating system. It finds particular use in the distillation and drying of combustible materials and in the baking and reduction of minerals.

The application of the invention is not limited to the arrangement described above. The regenerators grouped in pairs may all be placed on one side of the working chamber. The heated gas may pass entirely or in part through the working chamber and a part thereof may then be led into a continuous heat recuperator and ignited before passing into the latter, the other part going to the regenerators either with or without being passed through the working chamber and here also ignited by suitable air inlets before passing into the regenerators.

This heating arrangement may be embodied in various forms as shown diagrammatically in Figures 5, 6, 7 and 8 which show various modifications to which however the invention is not limited.

Figure 5 shows a case in which the two gases are heated in regenerators. The gas which serves as medium for transmitting heat to the substance to be heated passes in through the reversing valve $1'$, is heated in the regenerators $2'$, passes through the working chamber $3'$, where it heats the material to be heated and then passes into the regenerators $4'$. The air flows in through the reversing valve $5'$ and is heated in the regenerators $6'$, which communicate through the passages $7'$ with the regenerators $4'$. As the regenerators $4'$ are under suction the air and gases pass therethrough in combustion and heat the checkers of these regenerators. The regenerators $6'$ communicate by a channel $8'$ with the regenerators $9'$ which are in communication with the out-take. These regenerators communicate with the regenerators $2'$ by passages $10'$. The gas from the regenerators $2'$ is therefore burnt in the regenerators $9'$ and heats the fillings of the latter. When the reversing flaps $1'$ and $5'$ are operated the gas passes through the working chamber in the opposite direction and the regenerators $2'$ and $6'$ are heated.

The working chamber is at all times traversed by a current of hot gas without any air being present.

Figure 6 shows a modification with two regenerators $1^2$ and $2^2$ for the gas and a recuperator $4^2$ heated by gases taken from the working chamber $3^2$ of the furnace. The air from this recuperator is distributed according to the stage or period of operation to the regenerators $1^2$ and $2^2$ and to the recuperator gas inlet.

Figure 7 shows another arrangement in which the regenerators $1^3$ and $2^3$ are disposed on the same side of the working chamber $3^3$ and in which the recuperator $4^3$ is heated by the waste heat coming from the regenerators.

Figure 8 shows an arrangement in which the regenerators $1^4$ and $2^4$ are placed on one side of the working chamber $3^4$ and the recuperator $4^4$ on the other. The latter is heated by a part of the gas which has passed through the furnace and delivers its air to the regenerators $1^4$ and $2^4$ according to the reversal period as well as to the entry to the recuperator. It is obvious that the gases entering the regenerators or recuperators may also be burnt with cold air.

Figure 9 shows an arrangement in which the regenerators deliver directly upwards to the working chamber in such a way that the heat of the upper part of the checkers and of the flame at the time when this is formed is radiated into the working chamber or the furnace.

The furnace working chamber may be constructed in such a way that a part of the gas circulates in a double arch where it meets the air and is ignited. In this way it is possible to arrange a muffle furnace the walls of which are heated by a flame and the working chamber of which is traversed by hot gases. For example, in Figure 9 the gas coming from the chamber $1^5$ traverses the working chamber $9^5$ and is admitted to the chamber $8^5$ after having received a supply of air from the channel $7^5$. Another part of the gas passing through the chamber $1^5$ traverses the channel $2^5$ and is ignited in the space $4^5$ with an air supply coming in through the channel $3^5$. This flame heats the arch and the products of combustion pass out through the channel $5^5$ whence they go towards the regenerator $8^5$ which is at the heating stage. The air inlet $6^5$ to the arch is closed at this time and on reversal the flames circulate in the arch in the opposite direction, the channel $6^5$ being open and the channel $3^5$ closed.

Figure 11:
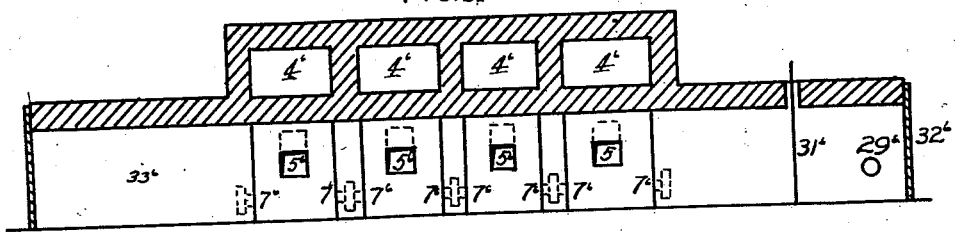

Figs. 11 and 12 are schematic views in which the circulation of the reducing gases is indicated by arrows.

In the normal operation the slide $31^6$ is raised and the door $32^6$ closed. Cold gas is supplied through the openings $29^6$ and circulates in the cooling zone as indicated by arrows, whereupon it will be mingled with the hot gases towards the chambers which are in the heating period.

It will be seen that in the period indicated by arrows drawn in full lines the gas is supplied to the bottom of the chambers $5^6$ and the bottom of the chambers $17^6$ is in communication with the stack.

Upon reversing the operation, the circulation of gases is indicated in dotted lines in Fig. 11.

The preheating zone $33^6$ may also be provided with slides such as $31^6$, whereby the hearth chamber of the furnace may be completely insulated at the moment the materials are introduced into and removed from the furnace.

I claim:—

1. A method of heating bodies and materials which comprises the step of placing the body to be heated in a closed chamber, passing a stream of heating gas through one of a pair of regenerators and through said closed chamber, mixing the outcoming gas from said closed chamber with air, igniting the mixture and passing the ignited mixture through the other of said pair of regenerators to an out-take, the flow of gases through the closed chamber and regenerators being periodically reversed and including the step of passing a burning mixture through a system of channels surrounding said closed chamber.

2. A method of heating and progressively cooling bodies in a reducing atmosphere which includes the steps of causing the bodies to travel through a furnace tunnel divided into a preheating, heating and a cooling zone, causing a stream of hot fuel reducing gas to pass periodically in opposite directions transversely across the heating zone of the tunnel furnace from one regenerating chamber into another regenerating chamber, the second regenerating chamber being heated by combustion of the fuel gas, causing a cold reducing gas to travel in the cooling zone in opposite direction to the bodies to be heated and mixing them with the hot gases for heating the regenerators.

3. A method of heating bodies and materials according to claim 2 including the step of passing a burning mixture through passage ways in the roof of the furnace which passage ways extend and are adjacent to the working chamber in the heating zone.

HERBERT SCHAEFER.